Dec. 11, 1923.
H. W. SANFORD
HUB AND JOURNAL BOX
Filed Sept. 25, 1923          4 Sheets-Sheet 1
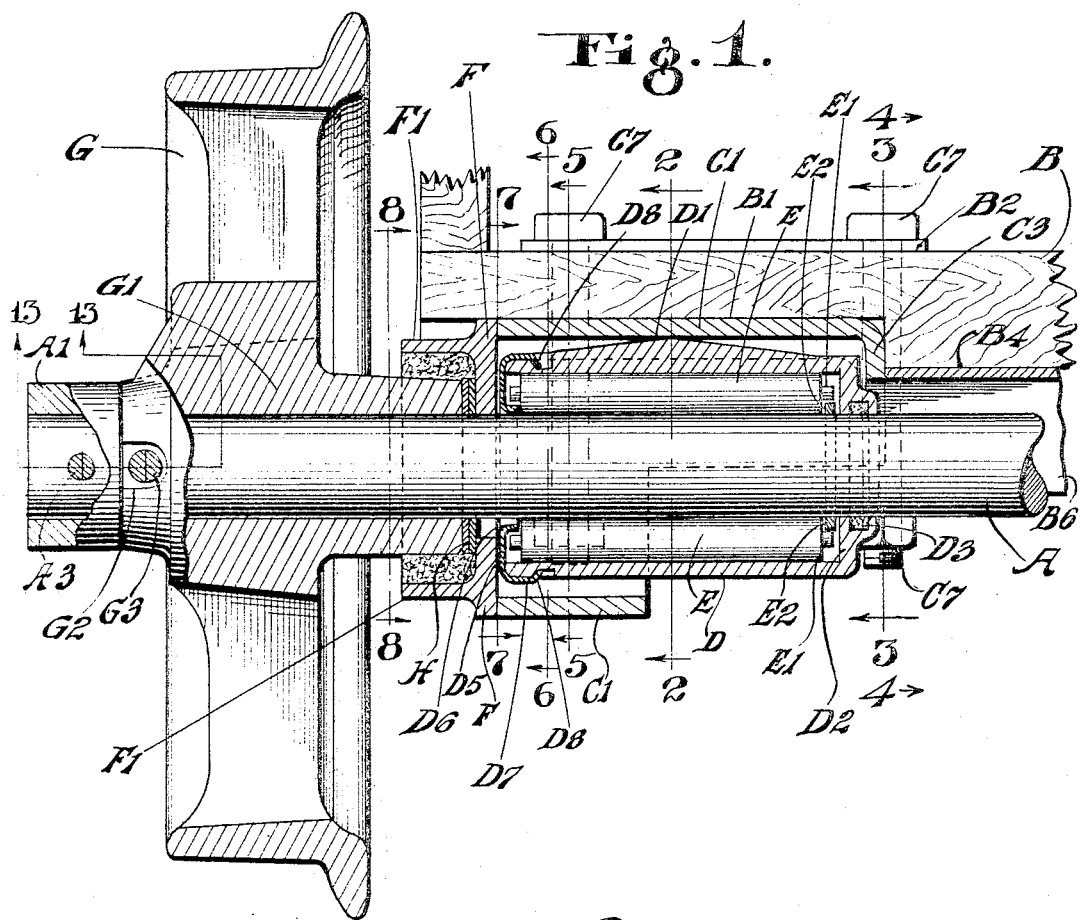
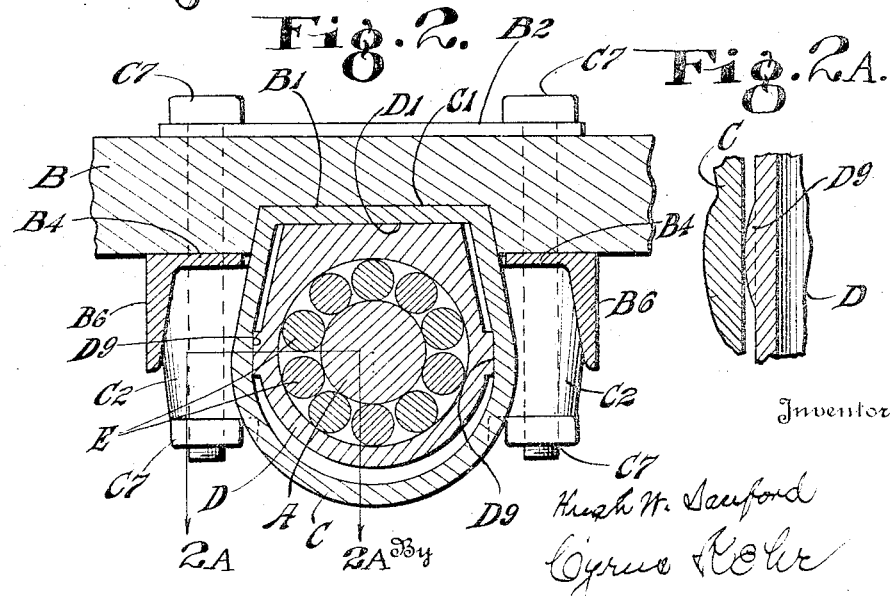

Dec. 11, 1923.　　　　　　　　　　　　　　　　1,477,449
H. W. SANFORD
HUB AND JOURNAL BOX
Filed Sept. 25, 1923　　　　4 Sheets-Sheet 2

Inventor
Hugh W. Sanford
By Cyrus Kehr
Attorney

Dec. 11, 1923.

H. W. SANFORD

HUB AND JOURNAL BOX

Filed Sept. 25, 1923  4 Sheets-Sheet 3

1,477,449

Inventor
Hugh W. Sanford
By Cyrus Kehr
Attorney

Dec. 11, 1923.

H. W. SANFORD

HUB AND JOURNAL BOX

Filed Sept. 25, 1923

Inventor
Hugh W. Sanford
Cyrus Kehr
Attorney

Patented Dec. 11, 1923.

1,477,449

UNITED STATES PATENT OFFICE.

HUGH W. SANFORD, OF KNOXVILLE, TENNESSEE.

HUB AND JOURNAL BOX.

Application filed September 25, 1923. Serial No. 664,651.

*To all whom it may concern:*

Be it known that I, HUGH W. SANFORD, a citizen of the United States, residing at Knoxville, in the county of Knox and State of Tennessee, have invented a new and useful Improvement in Hubs and Journal Boxes, of which the following is a specification, reference being had to the accompanying drawing.

This invention relates generally to hubs and axle boxes or bearings and particularly to mine cars in which a part or all of the wheels are fixed on the axles and the axles rest in bearings which are supported by the car body and which bearings are associated with pedestals.

The object of the invention is to provide in such a car for the taking of wheel end thrust by the pedestal and for removal of a wheel and the associated axle bearing without removing the axle and without disorganizing the bearing. By delivering the end thrust to the pedestal, the axle box is left free or "floating" on the axle, whereby the axle box may adjust itself to variations in the position of the axle. Thus the box is made truly self-aligning, the pressure of the box on the axle being balanced.

In the accompanying drawings:

Fig. 1 is a longitudinal, upright section along an axle and through a wheel and axle bearing embodying my improvement;

Fig. 2 is an upright section on the line 2—2, of Fig. 1, looking toward the left;

Figure 3:
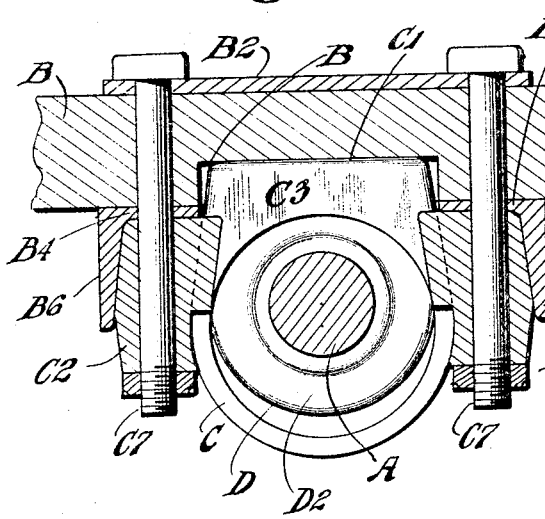
Figure 4:
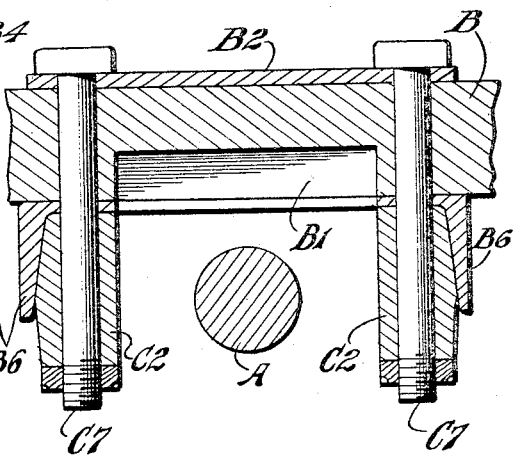
Figure 5:
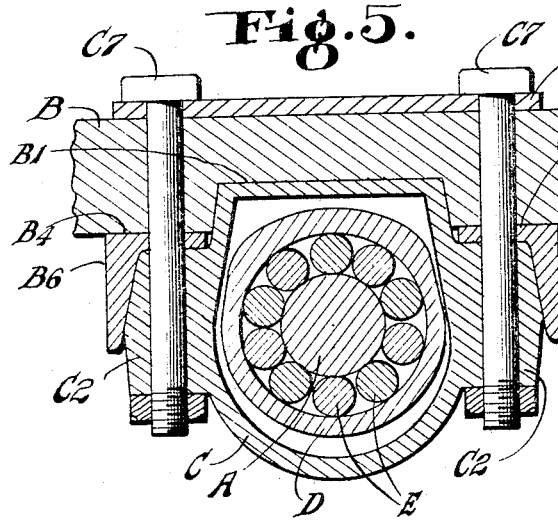
Figure 6:
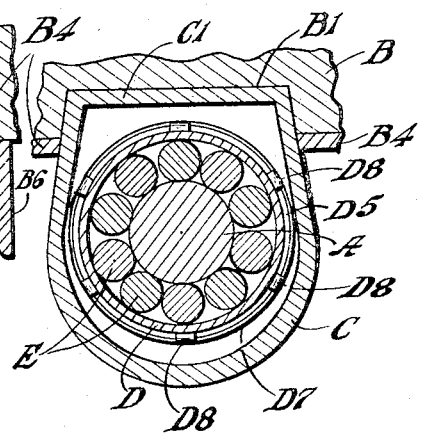
Figure 7:
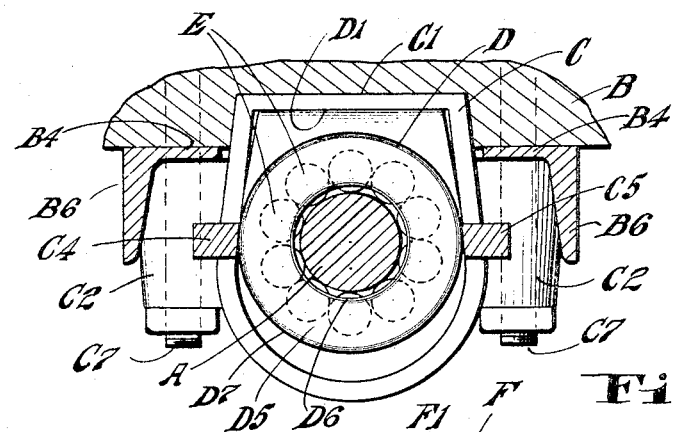
Figure 8:
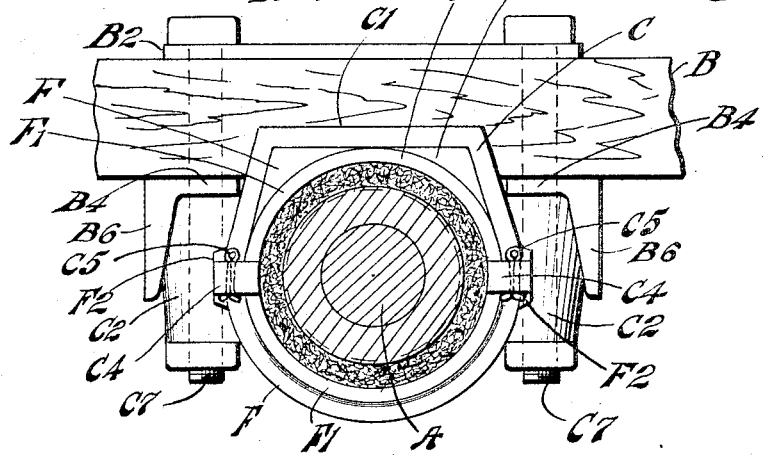
Figure 9:
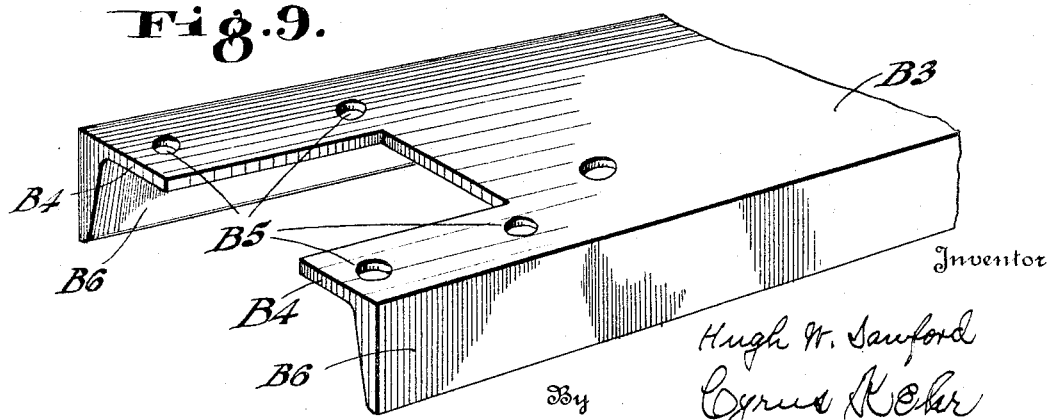
Figure 10:
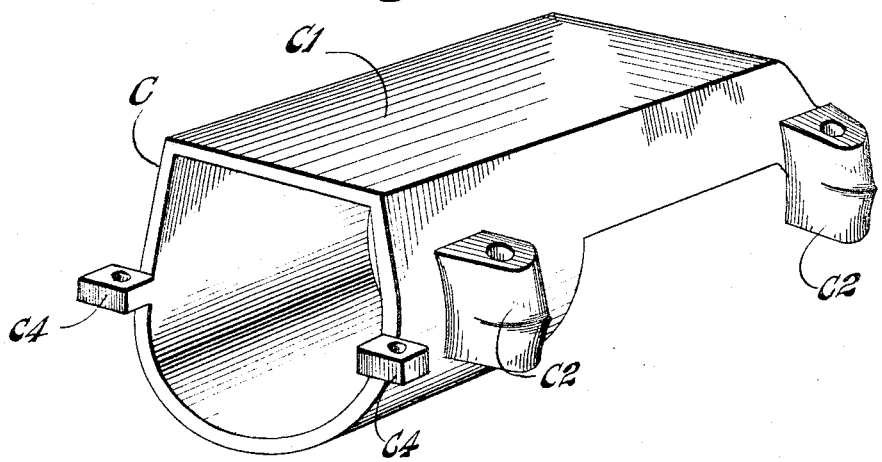
Figure 11:
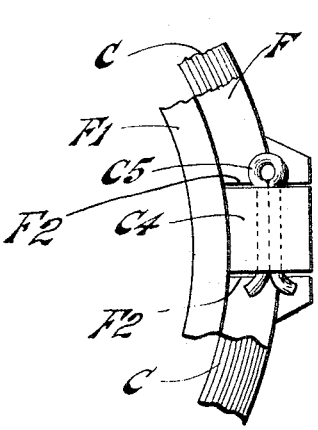
Figure 12:
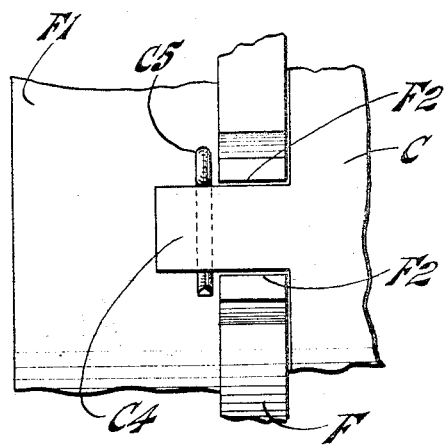
Figure 13:
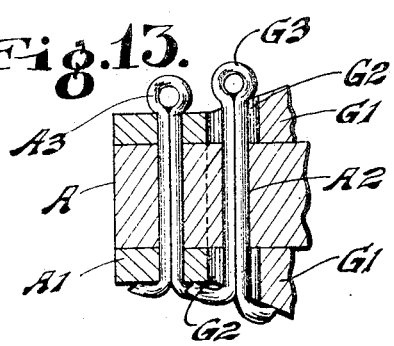

Fig. 2$^A$ is a horizontal section on the line, 2$^A$—2$^A$, of Fig. 2;

Fig. 3 is an upright section on the line, 3—3, of Fig. 1 looking toward the left;

Fig. 4 is an upright section on the line, 4—4, of Fig. 1 looking toward the right;

Fig. 5 is an upright section on the line, 5—5, of Fig. 1 looking toward the left;

Fig. 6 is an upright section on the line, 6—6, of Fig. 1 looking toward the left;

Fig. 7 is an upright section on the line, 7—7, of Fig. 1 looking toward the right;

Fig. 8 is an upright section on the line, 8—8, of Fig. 1 looking toward the right;

Fig. 9 is a perspective view of one end of one of the transverse channel plates which are applied to the lower face of the car bottom;

Fig. 10 is a perspective of the axle bearing housing or pedestal;

Figs. 11 and 12 are detail views of the fastening for the outer end wall of the housing or pedestal;

Fig. 13 is a horizontal section on the line, 13—13, of Fig. 1.

Referring to said drawings, A is the usual axle. The part which extends through the wheel and through the axle bearing or bearing box is cylindrical and of uniform diameter. The entire axle is preferably of this form, in order that it may be made of cold drawn steel, a process which is economical and also affords steel of high quality, whereby an axle of a given diameter is made stronger than can be made of hot rolled commercial steel.

B is the floor of the car body. In the form shown by the drawings, this floor is of wood. Its lower face is recessed at $B^1$ to make room for the pedestal or housing, C, of the axle bearing or axle box body, D. The upper part of said pedestal has a horizontal face, $C^1$, resting against the wood floor, as shown by Figs. 2, 5 and 6. On the floor above the recess, $B^1$, is a metal washer plate, $B^2$, through which extend four bolts, as will appear further on. The cross plate, $B^3$, one end of which is shown in perspective by Fig. 9, is applied to the lower face of the floor crosswise of the car and is slotted or cut out at each end to leave two arms, $B^4$, in which are holes, $B^5$, and which arms have downward-directed marginal flanges, $B^6$. The space between these arms is made right to bring one of the arms close to each side of the recess, $B^1$, and the sides of the pedestal, C, and to bring the edge of the plate between the arms close to the end of the pedestal. On each side of said pedestal are two lugs, $C^2$, which bear upward and sidewise against the adjacent arms, $B^4$. Bolts, $B^7$, extend downward through the washer plate, $B^2$, the floor, B, the adjacent arm, $B^4$, and the adjacent lug, $C^2$, and bind said parts to each other. The drawings show four such bolts applied to the pedestal.

The outer part of the side wall of the pedestal, C, extends entirely around the bearing body, D; but the inner part of said side wall reaches downward only as far as the horizontal, middle plane of the axle. The inner end of the pedestal, C, has an upright wall, $C^3$, which extends downward to the middle, horizontal plane of the axle and is cut out sufficiently to receive the axle and the adjacent end of the bearing body, D.

Between its ends, the upper face of the body, D, of the axle bearing has a transverse horizontal ridge or summit, $D^1$, resting against the lower face of the upper wall of the pedestal, C. Said ridge or summit is transverse to the axle and forms a line on which the bearing body may relatively rock on the lower face of the upper wall of the pedestal, this feature contributing to making this a self-aligning axle bearing, such as is already known in this art. The rocking above mentioned is on a horizontal face. Provision is also made for rocking on upright faces against the side walls of the pedestal. For this purpose upright, curved contact faces, $D^9$, are put on the outer faces of the axle box body, said faces, $D^9$, being concentric to an upright line cutting the axis of the axle approximately midway between the ends of the axle box body. Thus provision is made for a rocking which is equivalent to a partial rolling of the axle box on the upright pedestal wall against which the axle box is at the time pressing. Theoretically, the horizontal diameter of the axle box through the upright axis to which the faces, $D^9$, are concentric should be slightly less than the space between the adjacent upright walls of the pedestal, in order that the side of the axle box body which is not pressing against the upright pedestal wall adjacent thereto shall be free from said wall and not tend to hinder the rocking movement on the opposite pedestal wall.

The inner or right-hand end of the bearing body has an upright wall, $D^2$, which fits closely around the axle but permits free turning of the axle in the bearing. Within said end, a channel. $D^3$, is formed in the face of the wall which is next the axle. This channel is to receive felt or other packing material adapted to prevent the passing of oil and dust or cinders.

The opposite or outer end of the bearing or box body has no end wall formed integral with said body. A ring, $D^5$ surrounds the axle and bears against the end of said body. The main part of said ring is in a plane transverse to the axle. Next to the axle said ring has a flange, $D^6$, directed toward the opposite end of the bearing. Said ring also has an outer flange, $D^7$, which extends over a part of the outer face of the bearing body. Parts, $D^8$, of said flange are bent into a circumferential channel $D^4$, formed on the outer face of the bearing body. By this means, said ring is removably secured to the bearing body.

In the space around the axle and within the bearing body are anti-friction rollers, E, placed parallel to the axle and having at each end a small journal, $E^1$. At the outer end of the bearing, the flange, $D^6$, of the ring, $D^5$, prevents the rollers, E, from moving out of position by movement toward the axis of the bearing, when the bearing is removed from the axle. At the opposite or inner end of the bearing, a retaining ring, $E^2$, surrounds the axle and extends between the axle and the adjacent journals, $E^1$, said ring being so proportioned as to preclude movement of the journals, $E^1$, toward the bearing axis for the dislodging of the rollers when the bearing has been removed from the axle.

The outer end of the axle, A, is surrounded by a track wheel, G, having a hub, $G^1$, which extends nearly to the outer end of the bearing body, D. The outer end of the hub has two diametrically opposite notches, $G^2$, which are adapted to be brought into alignment with the transverse axle aperture, $A^2$, for receiving a cotter pin, $G^3$, which will serve to prevent rotation of the wheel independently of the axle. Next to the outer end of the hub, a sleeve, $A^1$, surrounds the axle and is secured thereto by a transverse cotter, $A^3$. This sleeve, $A^1$, bears against the adjacent end of the hub.

Between the inner end of the hub and the outer end of the pedestal, C, is placed the removable thrust wall, F, surrounding the axle. The inner faces of the pedestal, from the upright, transverse plane of the ridge, $D^1$, outward are parallel to the axis of the bearing. The outer end of the pedestal has an end face reaching into an upright plane to which the bearing axis is perpendicular. The thrust wall, F, has an inner face adapted to over-lap and bear closely against said end face of the pedestal. The opening in said wall through which the axle extends is made oblong with the long axis upright, in order to permit up-and-down play of the axle in the pedestal.

Between the wall, F, and the adjacent end of the hub, $G^1$, any desired number of washers, H, surround the axle. The wall, F, has a flange, $F^1$, approximately concentric to the axle and extending outward over the washers, H, and around the adjacent end of the hub, the diameter of said flange being sufficient to leave an annular space between the flange and said washers and the adjacent outer face of the hub to receive packing to prevent the passing of dust and cinders and to hold grease or other lubricant. This end wall is secured to the body of the pedestal as follows: Two tongues $C^4$ reach outward from the pedestal at opposite sides of the axle and through a notch or recess, $F^2$, formed in the edge of the wall, F. Each tongue is provided with a cotter pin, $C^5$, which bears against the end wall, F, to hold said wall against the pedestal.

It will now be seen that wheel thrust parallel to the axle and toward the car body will be taken by the thrust wall, F, and transmitted by the latter to the pedestal. The pedestal resists such thrust because of the binding by the bolts, $B^7$, and abutting of the pedestal against the edge of the cross plate, $B^3$, between the arms, $B^4$, and against the upright face of the wood floor, B, above said edge of the cross plate.

Thus the bearing box is left free or "floating" on the axle within the pedestal and is entirely free to take the rocking movements above described and to move endwise on the axle to the extent permitted by the fixed end wall, $C^3$, of the pedestal and the removable thrust wall, F, the space between said walls being intentionally made a little longer than the length of the bearing box. This structure makes the bearing box actually self-aligning—freely self-aligning. A bearing box which receives wheel thrust is not free for self aligning and can not bear evenly on the axle. Parts of the bearing surfaces will be pressed or jammed excessively on the axle, whereby free turning of the axle is prevented and damaging strains are concentrated upon portions of the bearing.

It will also be seen that the wheel, G, may be removed after removing the sleeve, $A^3$, and withdrawing the cotter, $G^3$, (if it is present). Then the washers, H, may be removed. Then, after removing the cotters, $C^5$, the thrust wall, F, may be removed. Then the bearing box, including its rollers, may be drawn endwise out of its pedestal and outward along the axle until it is entirely free from the axle, the rollers, E, being held in position by the rings, $E^2$ and $D^5$.

It is especially to be noted that the removal and replacing of these parts may be effected without disturbing either the axle or the pedestal, the latter remaining bolted securely to the car body.

It is also to be noted that the flanged thrust wall, F, performs two functions: (1) to cover the end of the pedestal and transmit to the pedestal end thrust from the hub, and (2) to so surround the end of the hub as to make feasible the exclusion of dust, dirt and cinders.

While the drawings show the axle box provided with anti-friction rollers, it is to be understood that the interior of the axle box may be formed otherwise, as with brass or cast iron bearing plates or faces. In such case, the axle box is still free or "floating" and self-aligning.

I claim as my invention:

1. In a structure of the kind described, the combination of an axle, a hub on the axle, a bearing surrounding the axle, a pedestal resting on the bearing, and a thrust wall extending across and detachably secured to the pedestal between the pedestal and the hub, substantially as described.

2. In a structure of the kind described, an axle, a hub on the axle, a bearing surrounding the axle, a pedestal resting on the bearing and having on its outer end members for forming engagement with the below-mentioned thrust wall, and a thrust wall extending across and detachably secured to said engaging members on the pedestal, substantially as described.

3. In a structure of the kind described, the combination of an axle, a hub on the axle, a bearing surrounding the axle, a pedestal resting on the bearing, and a thrust wall extending across and detachably secured to the pedestal between the pedestal and the hub and having a flange extending around the adjacent end of the hub, substantially as described.

4. In a structure of the kind described, an axle, a hub on the axle, a bearing surrounding the axle, a pedestal resting on the bearing and having on its outer end members for forming engagement with the below-mentioned thrust wall, and a thrust wall extending across and detachably secured to said engaging members on the pedestal and said thrust wall having a flange extending around the adjacent end of the hub, substantially as described.

5. In a structure of the kind described, the combination of an axle, a hub on the axle, a bearing surrounding the axle and comprising rollers and means for removably keeping the rollers in position in the bearing, a pedestal resting on the bearing, and a thrust wall extending across and detachably secured to the pedestal between the pedestal and the hub, substantially as described.

6. In a structure of the kind described, an axle, a hub on the axle, a bearing surrounding the axle and comprising rollers and means for removably keeping the rollers in position in the bearing, a pedestal resting on the bearing and having on its outer end members for forming engagement with the below-mentioned thrust wall, and a thrust wall extending across and detachably secured to said engaging members on the pedestal, substantially as described.

7. In a structure of the kind described, the combination of an axle, a hub on the axle, a bearing surrounding the axle and comprising rollers and means for removably keeping the rollers in position in the bearing, a pedestal resting on the bearing, and a thrust wall extending across and detachably secured to the pedestal between the pedestal and the hub and having a flange extending around the adjacent end of the hub, substantially as described.

8. In a structure of the kind described, an axle, a hub on the axle, a bearing surrounding the axle and comprising rollers and means for removably keeping the rollers in position in the bearing, a pedestal resting on the bearing and having on its outer end members for forming engagement with the below-mentioned thrust wall, and a thrust wall extending across and detachably secured to said engaging members on the pedestal and said thrust wall having a flange extending around the adjacent end of the hub, substantially as described.

In testimony wherof I have signed my name, this 8th day of September, in the year one thousand nine hundred and twenty three.

HUGH W. SANFORD.